Patented Apr. 23, 1946

2,399,085

UNITED STATES PATENT OFFICE 2,399,085

SYNTHETIC WAX COMPOSITION

Arthur F. Winslow, Schenectady, N. Y., assignor to General Electric Company, a corporation of New York No Drawing. Application July 19, 1943,
Serial No. 495,379

4 Claims. (Cl. 252—363.5)

The present invention relates to soluble compositions comprising a high molecular weight polyethylene glycol. It is particularly concerned with and has as its principal object the preparation of compositions comprising high molecular weight polyethylene glycol compositions characterized by an increased and uniform rate of solution in water.

The polyethylene glycols with which the present invention is concerned are those having an average molecular weight of at least about 4000, preferably about 9000. These solid waxy polymers are water-soluble, the rate of solution thereof decreasing with increased molecular weight of the polymeric material.

In accordance with my invention the rate of solution of these waxy materials is increased and made more uniform by the addition thereto of tartaric acid and sodium or equivalent alkaline bicarbonate which evolves carbon dioxide on reaction with the acid in the presence of water. In general, the proportions of tartaric acid and sodium bicarbonate incorporated into the solid polyethylene glycol will depend on the desired final rate of solution of the resultant composition and on the original solubility of the particular polymer employed. The tartaric acid and sodium bicarbonate together may comprise from 10 to 90 per cent by weight of the composition. The rate of solution of any given composition is directly proportional to the amount of tartaric acid and sodium bicarbonate contained therein. Ordinarily when the resultant product is to have a predetermined uniform rate of solution, I prefer to employ compositions containing from 40 to 60 per cent by weight of tartaric acid and sodium bicarbonate, preferably about 50 per cent, and to obtain any further variation in the solution rate of the product by the use of a higher or lower molecular weight polyethylene glycol.

The tartaric acid and the bicarbonate may be incorporated into the polyethylene glycol in any suitable manner provided the temperature of the polymer during and after the addition of the acid carbonate is below the decomposition temperature of the carbonate. In the preparation of a composition having a uniform solution rate, I prefer to dissolve or uniformly disperse the tartaric acid in the molten polymer and thereafter mix the carbonate into the resultant mass cooled to a temperature not exceeding 50° C. For example, a solid composition having a uniform solution rate at ordinary temperatures of 0.8 mil per second is prepared by dissolving 6 parts by weight of tartaric acid in 20 parts of a molten polyethylene glycol known as "Carbowax" 9000 compound and having a molecular weight of about 9000. The solution is cooled to approximately 50° C. and 14 parts sodium bicarbonate thoroughly mixed therewith. The resultant mass should thereafter be maintained below a temperature of approximately 50° C., which is the decomposition temperature of sodium bicarbonate.

Preferably the sodium or other alkaline bicarbonate and tartaric acid are introduced in a mole ratio of at least 2:1 although my invention is not limited to such proportions. Theoretically, a mole ratio of exactly 2:1 is sufficient. However, in practice it has been found that the use of an excess of the carbonate, for example between 2 and 3 moles of carbonate for one mole of tartaric acid, is desirable in order to obtain maximum reaction thereof with all of the tartaric acid.

Compositions prepared in accordance with my invention may be used for various purposes. For example, they may be used as a temporary seal adapted for use where it is desired that the seal be broken after contact with water for a predetermined period of time. They may also be used as readily soluble binders for pigments, bath salts, or similar materials in the manufacture of cakes or pellets from such materials. With or without the addition of fillers or reinforcing materials such as sand, unglazed paper asbestos, fibrous materials, etc., the compositions can be used in the manufacture of temporary coil forms for instrument armatures and the like. In such applications the forms are eliminated by solution of the waxy binder in water after the coils are wound.

What I claim as new and desire to secure by Letters Patent of the United States is:

1. A water-soluble solid composition of matter characterized by a substantially constant rate of solution in water, said composition comprising a mixture of sodium carbonate and a solution of tartaric acid in a polyethylene glycol having an average molecular weight of at least 4000, the said tartaric acid and sodium bicarbonate being present in a mole ratio of about 1 mole tartaric acid to from 2 to 3 moles sodium bicarbonate and together comprising from about 40 to 60 per cent by weight of the polyethylene glycol-tartaric acid-sodium bicarbonate composition.

2. A water-soluble solid composition of matter consisting of about 20 parts by weight of a polyethylene glycol having an average molecular weight of about 9000, 6 parts tartaric acid dissolved in said polyethylene glycol, and 14 parts sodium bicarbonate, the said composition having a higher and more uniform rate of solution in water than the unmodified polyethylene glycol contained therein.

3. The method of preparing a solid composition of matter having a substantially uniform rate of solution in water which comprises dissolving tartaric acid in a molten polyethylene glycol having an average molecular weight of at least 4000, cooling said solution to about 50° C. and mixing with said solution sodium bicarbonate in an amount equal to from two to three moles sodium bicarbonate per mole tartaric acid, the proportions of tartaric acid and sodium bicarbonate being such that they together comprise from 40 to 60 per cent by weight of the composition.

4. A composition of matter as in claim 1 wherein the polyethylene glycol has an average molecular weight of about 9000.

ARTHUR F. WINSLOW.